(12) United States Patent
Ding et al.

(10) Patent No.: US 8,611,461 B2
(45) Date of Patent: Dec. 17, 2013

(54) METHOD AND DEVICE FOR MODULATING THE INFORMATION OF TFCI

(75) Inventors: Yu Ding, Beijing (CN); Xiaodong Yang, Beijing (CN); Xunwei Zhao, Beijing (CN); Shiyan Ren, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 705 days.

(21) Appl. No.: 12/673,490

(22) PCT Filed: Aug. 13, 2008

(86) PCT No.: PCT/CN2008/001463
§ 371 (c)(1),
(2), (4) Date: Mar. 9, 2010

(87) PCT Pub. No.: WO2009/021407
PCT Pub. Date: Feb. 19, 2009

(65) Prior Publication Data
US 2011/0280339 A1    Nov. 17, 2011

(30) Foreign Application Priority Data
Aug. 13, 2007   (CN) .......................... 2007 1 0120208

(51) Int. Cl.
*H04L 27/36* (2006.01)
(52) U.S. Cl.
USPC ......................................... 375/298

(58) Field of Classification Search
USPC .................. 370/465, 336, 252; 375/262, 261
See application file for complete search history.

(56) References Cited

U.S. PATENT DOCUMENTS

| | | | | |
|---|---|---|---|---|
| 5,105,442 A | * | 4/1992 | Wei ................................ | 375/262 |
| 2002/0013926 A1 | * | 1/2002 | Kim et al. .................... | 714/781 |
| 2004/0005011 A1 | * | 1/2004 | Trott et al. .................... | 375/262 |

FOREIGN PATENT DOCUMENTS

| | | | |
|---|---|---|---|
| CN | 1372394 A | | 10/2002 |
| CN | 1418421 A | | 5/2003 |
| CN | 1481629 A | | 3/2004 |
| DE | 10109338 A1 | * | 9/2002 |
| WO | 2006089569 A1 | | 8/2006 |

* cited by examiner

*Primary Examiner* — Chieh M Fan
*Assistant Examiner* — Wednel Cadeau
(74) *Attorney, Agent, or Firm* — Ladas & Parry, LLP

(57) ABSTRACT

A modulation method and device for modulating transfer format combination indicator TFCI information, the method including: dividing equally original TFCI information in a unit of 2 bits in a transmission time interval TTI; extending the resultant respective parts of the TFCI information after the division to correspond to identifiers of one or more designated energy points in a preset constellation; and mapping the respective extended parts of the TFCI information to the corresponding energy points for modulating.

20 Claims, 10 Drawing Sheets

| Slot Format | Spreading Factor | Midamble length (chips) | NTFCI code word (bits) | NSS & NTPC (bits) | Bits/slot | NData/Slot (bits) | Ndata/data field(1) (bits) | Ndata/data field(2) (bits) |
|---|---|---|---|---|---|---|---|---|
| 0 | 16 | 144 | 0 | 0 & 0 | 176 | 176 | 88 | 88 |
| 1 | 16 | 144 | 8 | 0 & 0 | 176 | 172 | 84 | 88 |
| 2 | 1 | 144 | 0 | 0 & 0 | 2816 | 2816 | 1408 | 1408 |
| 3 | 1 | 144 | 8 | 0 & 0 | 2816 | 2812 | 1404 | 1408 |

Fig. 1

METHOD AND DEVICE FOR MODULATING THE INFORMATION OF TFCI

CROSS-REFERENCE TO RELATED APPLICATIONS

This application is the U.S. National Stage of International Patent Application No. PCT/CN2008/001463, filed on Aug. 13, 2008, which claims priority to Chinese Patent Application No. 200710120208.7, filed Aug. 13, 2007, the disclosure of which is incorporated herein by reference.

FIELD OF THE INVENTION

The present invention relates to the field of communications and particularly to a method and device for modulating TFCI information.

BACKGROUND OF THE INVENTION

Currently, a Quadrature Amplitude Modulation (QAM) scheme has been introduced over a Secondary Common Control Physical Channel (SCCPCH) in a Multimedia Broadcast and Multicast Service (MBMS) to improve the throughput of a system.

A Low Chip Rate Time Division Duplex MBMS (LCR TDD MBMS) is introduced below by way of an example. The LCR TDD MBMS with a 16QAM scheme may adopt four timeslot formats as illustrated in FIG. 1, which specify an amount of data transmitted in and constituent fields of respective timeslots as well as whether to carry Transport Format Combination Indicator (TFCI) information in the transmitted data. The TFCI information is used to indicate a combining mode of the data. For example, the TFCI information indicates to a recipient that the first 20 bits in its received data of 80 bits relate to a first set of data and the last 60 bits relate to a second set of data. As illustrated in FIG. 1, no TFCI information is required to be carried in transmitted data in the two timeslot formats with serial numbers of "0" and "2", and TFCI information of 8 bits is required to be carried in transmitted data in the two timeslot formats with serial numbers of "1" and "3".

Currently, occupancy of two 5 ms timeslots, i.e., 10 ms, is required for transmission of a data frame in the LCR TDD MBMS with the 16QAM scheme. Referring to FIG. 2, first and second timeslots are occupied for a data frame of 10 ms, and if TFCI information of 8 bits is carried in the data frame, the TFCI information is divided into two halves, and the first and second 4-bit halves of TFCI information are arranged respectively at corresponding locations in the first and second timeslots. Taking the first timeslot as an example below and as illustrated in FIG. 2, data transmitted in the first timeslot is divided into the first and second parts of data between which midamble codes are sandwiched for channel estimation as specified in the timeslot formats as illustrated in FIG. 1, so that the first half of TFCI information is arranged following the first part of data in the first timeslot in order to transmit the TFCI information; and alike the second half of TFCI information is arranged following the first part of data in the second timeslot. As such, the TFCI information of 8 bits can be transmitted to the recipient in the data frame. The data frame is retransmitted at an interval of 10 ms in the case of a Transmission Time Interval (TTI) of 20 ms/40 ms/80 ms.

In the prior art, various information is subject to a loss during transmission thereof, and since the data length of TFCI information is only 8 bits in the LCR TDD MBMS with the 16QAM scheme, the recipient apparently fails to demodulate corresponding part of data according to obtained TFCI information if the TFCI information is subject to a substantial loss during transmission thereof.

An existing solution to the foregoing issue is as follows:

Referring to FIG. 3, TFCI information is firstly mapped to a LCR TDD 16QAM constellation for modulation prior to addition thereof into a data frame in the LCR TDD MBMS in order to maintain the signal strength of the TFCI information. As illustrated in FIG. 3, there are sixteen energy points in the LCR TDD 16QAM constellation, each of the energy points is identified with a binary code with a data length of 4 bits, the intersection of Q and I coordinate axes is referred to as the origin of the LCR TDD 16QAM constellation, and the distance of each energy point from the origin is associated with the power of the energy point so that the energy point further from the origin has larger power. Therefore in a practical application, four energy points closest to the origin each are referred to as a low energy point or a minimum power point, four energy points furthest from the origin each are referred to as a high energy point or the maximum power point, and remaining eight energy points each are referred to as an intermediate energy point or an intermediate power point. For modulation of the TFCI information, the TFCI information of 8 bits is mapped unbiasedly to two of the energy points in the LCR TDD 16QAM constellation to maintain specific signal strength of the TFCI information. For example, the TFCI information of "11011000" is divided into two halves of "1101" and "1000", and the two halves of TFCI information are mapped respectively to the two energy points identified with "1101" and "1000" for modulating.

Unfortunately, the foregoing method can not be used to satisfactory because although the TFCI information of 8 bits is mapped to the first and second energy points in the LCR TDD 16QAM constellation, the modulated TFCI information may still fail to attain ideal signal strength if the first and/or second energy point is a low energy point closest to the origin, such as "1000", thus resulting in an influence upon the effect of demodulation at the recipient; and on the other hand, multiple mapping of different TFCI information may occur during modulation, and if there is a considerable difference between the number of times that the TFCI information is mapped to the low energy points and the number of times that it is mapped to the high energy points, a relatively large peak-to-average ratio (the ratio of peak to average) may arise in the system to consequently cause fluctuation of average power in the system and a consequential influence upon stability of the system.

SUMMARY OF THE INVENTION

Embodiments of the invention provide a method and device for modulating TFCI information to both ensure demodulating performance of the modulated TFCI information and avoid the drawback of fluctuating average power due to modulation of the TFCI information.

Technical solutions according to the embodiments of the invention are as follows.

A method for modulating Transport Format Combination Indicator TFCI information, including:

dividing equally original TFCI information in a unit of 2 bits in a Transmission Time Interval TTI;

extending the resultant respective parts of the TFCI information after the division to correspond to identifiers of one or more designated energy points in a preset constellation; and mapping the respective extended parts of the TFCI information to the corresponding energy points for modulating.

A modulation device for modulating Transport Format Combination Indicator TFCI information, including:

a storage unit adapted to store a preset constellation;

an extension unit adapted to equally divide acquired original TFCI information in a unit of 2 bits in a Transmission Time Interval TTI and extend the resultant respective parts of the TFCI information after the division to correspond to the identifiers of one or more designated energy points in the preset constellation; and a modulation unit adapted to map the respective extended parts of the TFCI information to the corresponding energy points.

In the embodiments of the invention, the modulation device may modulate the original TFCI information by extending the respective parts of TFCI information, into which the original TFCI information is divided equally in a unit of 2 bits, to correspond to the identifier of at least one designated energy point in the preset constellation and mapping unbiasedly the respective extended parts of TFCI information to the corresponding energy point, thereby ensuring the signal strength of the TFCI information in the system and hence the demodulating performance of the TFCI information, and also avoiding the fluctuating of average power in the system and hence improving stability of the system to some extent.

BRIEF DESCRIPTION OF THE DRAWINGS

FIG. 1 is a schematic diagram of the 16QAM timeslot format for the LCR TDD MBMS in the prior art;

DETAILED DESCRIPTION OF THE EMBODIMENTS

In an embodiment of the invention, in order to both ensure demodulating performance of the modulated TFCI information and avoid the fluctuating of average power in a system due to modulation of the TFCI information, acquired original TFCI information is divided equally in a unit of 2 bits within a TTI; resultant respective parts of the TFCI information after the equal division are extended to correspond to at least one other designated energy point than the minimum power point in a preset constellation used for modulation of the TFCI information, where if the number of the designated energy points is larger than one, all the designated energy points have the same power; and then the respective extended parts of the TFCI information are mapped to the corresponding energy points for modulating.

Detailed descriptions are presented below by way of example of a Low Chip Rate Time Division Duplex Multimedia Broadcast and Multicast Service (LCR TDD MBMS).

In an embodiment of the invention, original TFCI information with a data length of 8 bits to be transmitted in the LCR TDD MBMS with the 16QAM is extended into new TFCI information with a data length of 16 bits. For example, the original TFCI information of "00011011" is divided equally into four parts of "00", "01", "10" and "11" with reference to columns of $d_{4k}$ and $d_{4k+1}$ in Table 1, and then data of 2 bits is appended following the respective parts of the TFCI information with reference to columns of $d_{4k+2}$ and $d_{4k+3}$ in Table 1 so that each of the parts of the TFCI information is extended in data length from 2 bits to 4 bits, that is, the parts of the TFCI information is converted into "0011", "0111", "1011" and "1111". Thus, the original TFCI information with a data length of 8 bits is updated into the new TFCI information with a data length of 16 bits, i.e., "0011011110111111".

TABLE 1

| $d_{4k}$ | $d_{4k+1}$ | $d_{4k+2}$ | $d_{4k+3}$ |
|---|---|---|---|
| 0 | 0 | 1 | 1 |
| 0 | 1 | 1 | 1 |
| 1 | 0 | 1 | 1 |
| 1 | 1 | 1 | 1 |

The foregoing implementation is based upon the following consideration.

Figure 2:
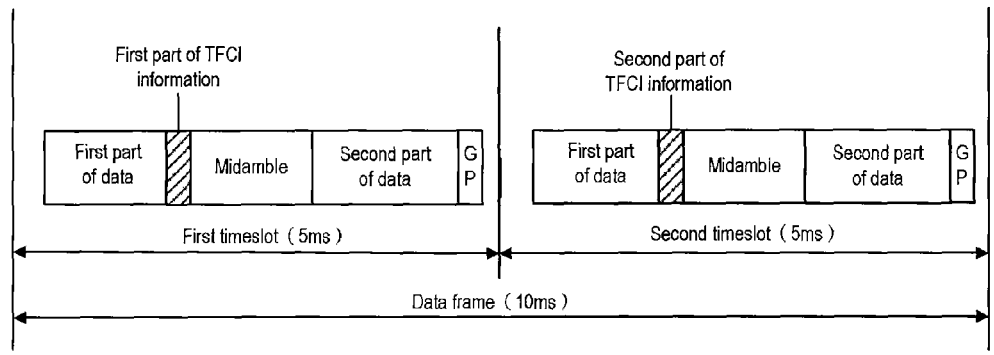
FIG. 2 is a schematic diagram of a data frame structure for the LCR TDD MBMS in the prior art.
Figure 3:
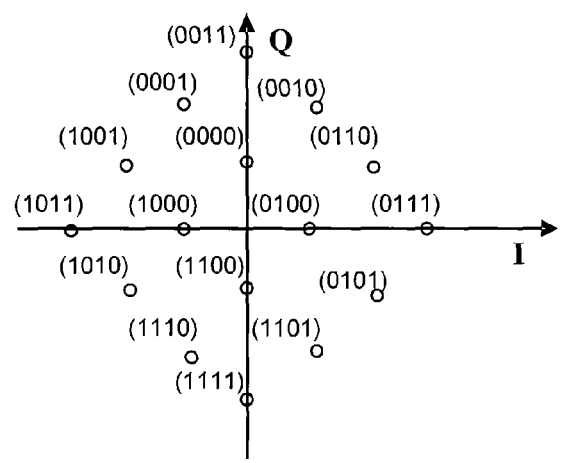
FIG. 3 illustrates an LCR TDD 16QAM constellation in the prior art.
Figure 4:
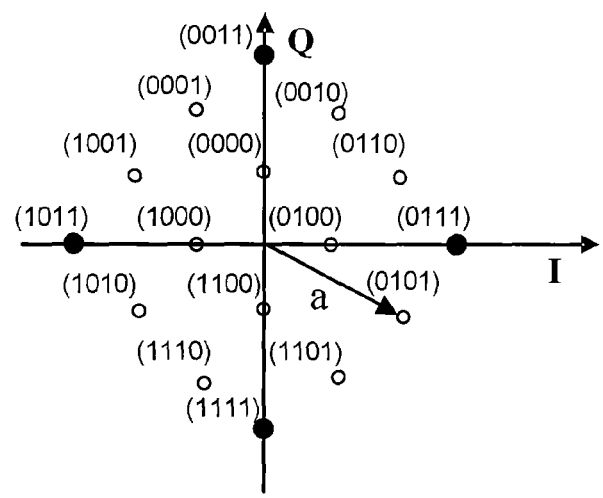
FIG. 4 illustrates a first LCR TDD 16QAM constellation in an embodiment of the invention.

Referring to FIG. 4, a square of the distance of each energy point from the origin in the LCR TDD 16QAM constellation indicates the magnitude of signal power of the TFCI information mapped to the energy point. For example, the distance of the energy point 0101 from the origin is denoted as a, and then unbiased mapping of TFCI information to the energy point 0101 means modulation of signal power of the TFCI information to $a^2$. As illustrated in FIG. 4, energy points in the LCR TDD 16QAM constellation are distributed evenly in a square with diagonals coinciding with the Q and I axes, and it can be seen that four energy points identified with "0011", "0111", "1011" and "1111" each are at an identical distance from the origin and the furthest to the origin as compared with other energy points and therefore referred to as high energy point or the maximum power point. If the TFCI information is mapped unbiasedly to the four high energy points of "0011", "0111", "1011" and "1111", the TFCI information can be maintained with the maximum signal power, thereby ensuring demodulating performance of the TFCI information.

Figure 5:
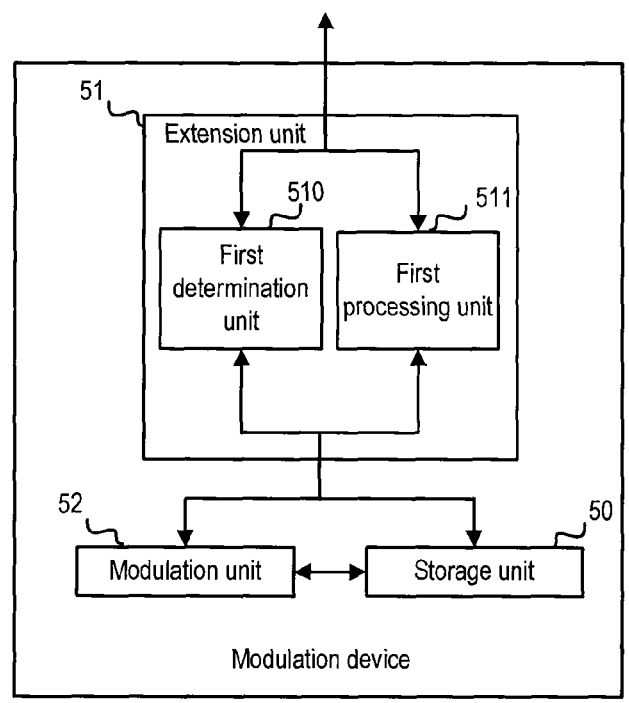
FIG. 5 is a block diagram showing the structure of a first modulation device in an embodiment of the invention.

Referring to FIG. 5, a modulation device for modulating TFCI information according to an embodiment of the invention includes a storage unit 50, an extension unit 51 and a modulation unit 52.

The storage unit 50 is adapted to store preset timeslot format information and an LCR TDD 16QAM constellation for modulation of TFCI information.

The extension unit 51 is adapted to equally divide acquired original TFCI information into four parts in a unit of 2 bits within a TTI, and extend respectively the four parts of the TFCI information according to the LCR TDD 16QAM constellation to correspond respectively to identifiers of four designated power points in the LCR TDD 16QAM constellation.

The modulation unit 52 is adapted to map the four extended parts of the TFCI information respectively to the corresponding power points in the LCR TDD 16QAM constellation.

Particularly, the extension unit 51 further includes a first determination unit 510 and a first processing unit 511.

The first determination unit 510 is adapted to determine the designated power points, which are the maximum power points in the LCR TDD 16QAM constellation.

The first processing unit 511 is adapted to extend the resultant respective parts of the TFCI information after the division to correspond to the identifiers of the maximum power points.

Figure 6A:
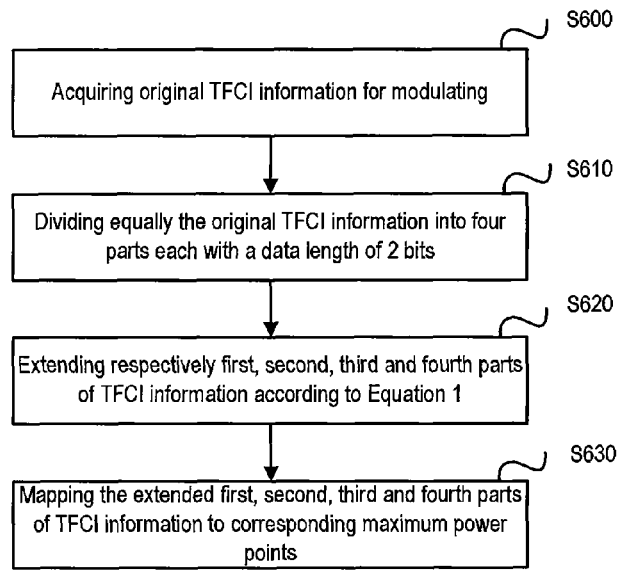
FIG. 6A is a flow chart of a first method for modulating TFCI information in an embodiment of the invention.

Referring to FIG. 6A, the modulation device in the present embodiment modulates the TFCI information according to the LCR TDD 16QAM constellation in a first method with the following specific flow.

Process S600: The modulation device acquires original TFCI information, i.e. "00011011" in the present embodiment, to be modulated within a TTI.

Process S610: The modulation device divides equally the original TFCI information into four parts in a unit of 2 bits, i.e., "00", "01", "10" and "11", respectively.

Process S620: The forgoing four parts of the TFCI information are extended respectively according to Equation 1, so that each of the parts of the TFCI information with a data length of 2 bits is converted to be in a data length of 4 bits.

$$d_{4k}=b_{2k}$$
$$d_{4k+1}=b_{2k+1} \quad [1]$$
$$d_{4k+2}=1$$
$$d_{4k+3}=1$$

Where $b_{2k}$ and $b_{2k+1}$ denote respectively first and second binary codes in each of the parts of the TFCI information prior to extension thereof, and $d_{4k}$, $d_{4k+1}$, $d_{4k+2}$ and $d_{4k+3}$ denote respectively first, second, third and fourth binary codes in each of the extended sets of 4-bit TFCI information.

As can be apparent in the present embodiment, two binary codes of "11" are appended respectively following the respective sets of TFCI information when the forgoing four parts of TFCI information are extended, so that the foregoing four extended parts of TFCI information are converted into "0011", "0111", "1011" and "1111". As illustrated in FIG. 4, the extended first, second, third and fourth parts of TFCI information correspond respectively to the identifiers of the four maximum power points in the LCR TDD 16QAM constellation.

Process S630: The extended first, second, third and fourth parts of TFCI information are respectively modulated, i.e., mapped unbiasedly to the four maximum power points in the LCR TDD 16QAM constellation.

Figure 6B:
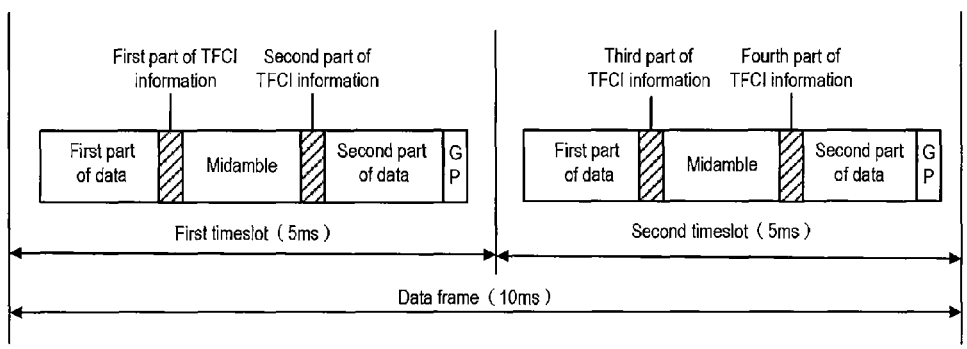
FIG. 6B is a schematic diagram of a first data frame structure in an embodiment of the invention.

Based upon the foregoing embodiment, the modulation device arranges the four extended parts of TFCI information at corresponding locations in a data frame after modulation thereof for encapsulation of the data frame. As illustrated in FIG. 6B, for example, in a data frame of 10 ms, the first and second parts of TFCI information are arranged respectively on both sides of midamble codes in the first timeslot, i.e., following the first part of data and preceding the second part of data in the first timeslot; and alike the third and fourth parts of TFCI information are arranged respectively on both sides of midamble codes in the second timeslot. Of course, the four parts of TFCI information may alternatively be arranged at other locations in the respective timeslots, e.g., preceding the first part of data and following the second part of data, and redundant description thereof is omitted here. The modulation device may transmit the data frame subject to encapsulation to a corresponding recipient.

In a practical application, the modulation device retransmits the data frame of 10 ms at an interval of 10 ms in the case of a Transmission Time Interval (TTI) of more than 10 ms for the LCR TDD MBMS, for example, 20 ms, 40 ms or 80 ms. Thus, the extended TFCI information can be mapped always to the maximum power points, thereby ensuring as good demodulating performance as possible of the TFCI information; and also the four maximum power points have the same power, thereby avoiding the fluctuating of power in the system during modulation.

Of course, if the original TFCI information is "11111111" or "00110011", the modulation device may simply map the respective extended parts of TFCI information to the same maximum power point of "1111" or respectively to the two maximum power points of "0011" and "1111" for modulation to thereby achieve the same technical effect.

Figure 7A:
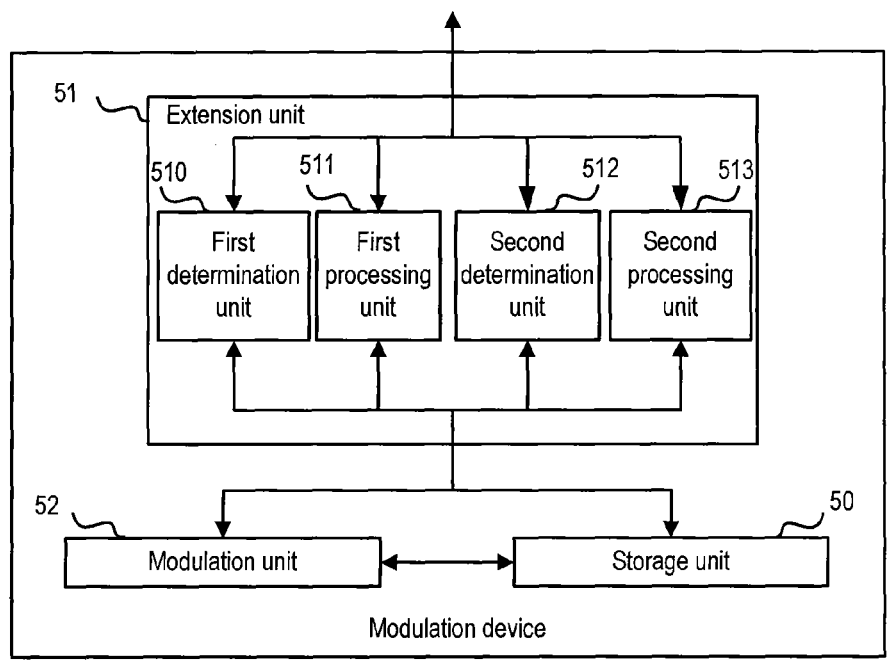
FIG. 7A is a block diagram showing the structure of a second modulation device in an embodiment of the invention.

Based upon the foregoing embodiment, the modulation device may further select alternately one among maximum and minimum power points to modulate the same TFCI information to further avoid excessive average power in the system. Referring to FIG. 7A, the extension unit 51 in the modulation device of the present embodiment further includes a second determination unit 512 and a second processing unit 513.

The second determination unit 512 is adapted to determine the minimum power points in the LCR TDD 16QAM constellation.

The second processing unit 513 is adapted to extend the resultant respective parts of the TFCI information after the division to correspond to the identifiers of the minimum power points.

Particularly, in a TTI, the modulation device extends the resultant respective parts of the TFCI information after the division using alternately the first processing unit 511 and the second processing unit 513 at a preset interval, that is, the TFCI information is extended in a unit of the preset interval within the TTI by extending the resultant respective parts of the TFCI information after the division in one of any two adjacent intervals to correspond to the identifiers of the maximum power points and in the other interval to correspond to the identifiers of the minimum power points.

The modulation unit 52 is adapted to map the respective extended parts of TFCI information to the corresponding maximum or minimum power points.

Detailed descriptions are presented below by way of example of a LCR TDD MBMS with a TTI of 20 ms and a data frame of 10 ms.

Figure 7B:
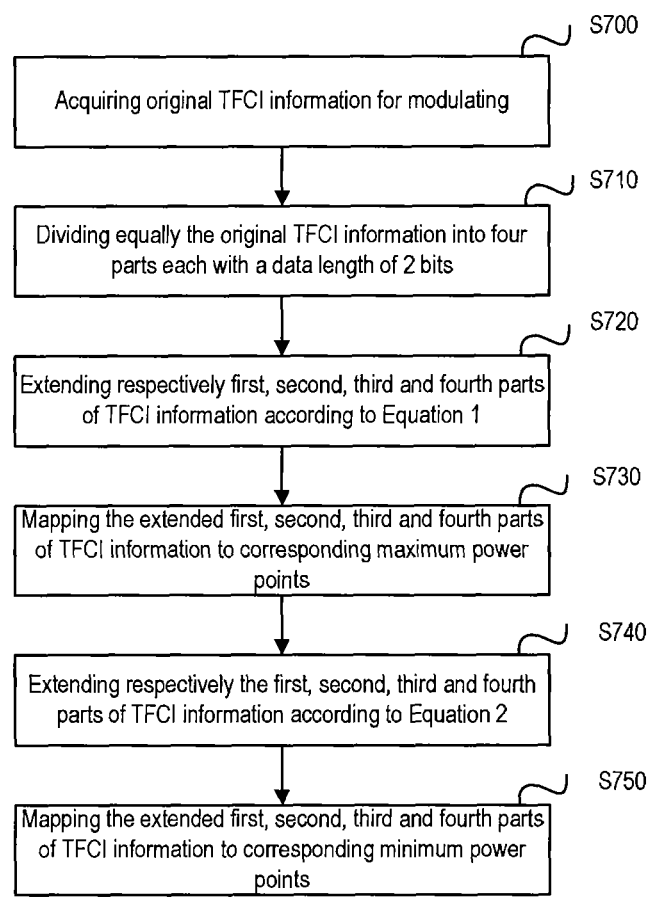
FIG. 7B is a flow chart of a second method for modulating TFCI information in an embodiment of the invention.

In the present embodiment, in the case of a TTI of 20 ms and occupancy of 10 ms required for transmission of a data frame, it can be apparent that two data frames can be transmitted in a TTI, referred respectively to as a data frame A and a data frame B in an order that they are transmitted, and then the modulation device modulates the TFCI information twice prior to encapsulation in the data frames A and B. Referring to FIG. 7B, the modulation device in the present embodiment modulates the TFCI information according to the LCR TDD 16QAM constellation in a second method with the following specific flow.

Process S700: The modulation device acquires original TFCI information, i.e. "00011011" in the present embodiment, for modulation within a TTI.

Process S710: The modulation device divides equally the original TFCI information into four parts in a unit of 2 bits, i.e., "00", "01", "10" and "11" respectively.

Process S720: The modulation device extends respectively the four parts of "00", "01", "10" and "11" according to Equation 1 to convert the four parts into "0011", "0111", "1011" and "1111" corresponding to the identifiers of the four maximum power points in the LCR TDD 16QAM constellation.

Process S730: The modulation device modulates respectively the first, second, third and fourth parts of TFCI information extended according to Equation 1, that is, the modulation device maps unbiasedly "0011", "0111", "1011" and "1111" respectively to the four maximum power points in the LCR TDD 16QAM constellation as illustrated in FIG. 4.

The modulation device encapsulates the extended first, second, third and fourth parts of TFCI information at corresponding locations in the data frame A after modulation thereof.

Process S740: The modulation device extends respectively the four parts of "00", "01", "10" and "11" according to Equation 2 to convert the four parts into "0000", "0100", "1000" and "1100" corresponding to the identifiers of the four minimum power points in the LCR TDD 16QAM constellation.

$$d_{4k}=b_{2k}$$

$$d_{4k+1}=b_{2k+1} \quad [2]$$

$$d_{4k+2}=0$$

$$d_{4k+3}=0$$

Where the respective symbols refer to the same elements as those in Equation 1, and it can be seen from Equation 2 that the modulation device extends the foregoing four parts of TFCI information according to Equation 2 by appending two binary codes of "00" respectively following the respective set of TFCI information.

Figure 7C:
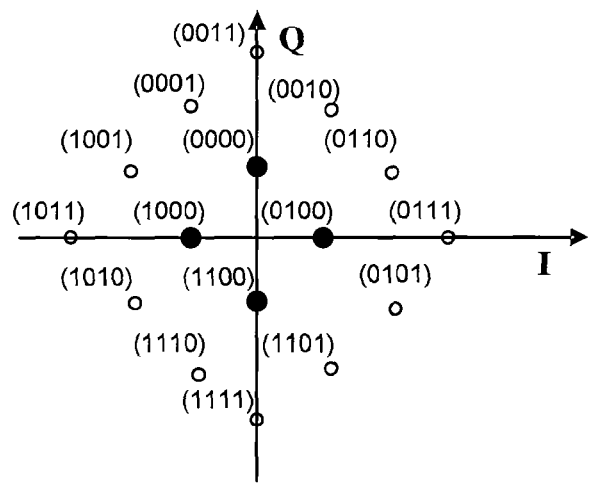
FIG. 7C illustrates a second LCR TDD 16QAM constellation in an embodiment of the invention.

Process S750: The modulation device modulates respectively the first, second, third and fourth parts of TFCI information extended according to Equation 2, that is, maps unbiasedly "0000", "0100", "1000" and "1100" respectively to the four minimum power points in the LCR TDD 16QAM constellation as illustrated in FIG. 7C.

The modulation device encapsulates the extended first, second, third and fourth parts of TFCI information at corresponding locations in the data frame B after modulation thereof.

In the foregoing embodiment, in the case of a TTI of 40 ms, i.e., of transmitting four data frames within a TTI, referred respectively to as a data frame A, a data frame B, a data frame C and a data frame D in an order that they are transmitted, then after encapsulation in the data frame B, the modulation device extends according to Equation 1 again the respective parts of TFCI information into which the original TFCI information is divided equally, maps the respective extended parts of TFCI information respectively to the four maximum power points in the LCR TDD 16QAM constellation for modulation and encapsulates the respective modulated parts of TFCI information at corresponding locations in the data frame C; and alike after encapsulation in the data frame C, the modulation device extends according to Equation 2 again the respective parts of TFCI information into which the original TFCI information is divided equally, maps the respective extended parts of TFCI information respectively to the four minimum power points according to the LCR TDD 16QAM constellation and encapsulates them at corresponding locations in the data frame D.

Alternatively, it is of course possible to modulate the respective parts of TFCI information to be encapsulated in the data frames A and C according to Equation 2 and to modulate the respective parts of TFCI information to be encapsulated in the data frames B and D according to Equation 1, and redundant descriptions thereof is omitted here.

It can be seen from the foregoing embodiment, in the case of a TTI in the system of more than 10 ms, e.g., 20 ms, 40 ms or 80 ms, the modulation device modulates the respective parts of TFCI information, into which the original TFCI information is divided equally, using alternately the maximum and minimum power points, thereby ensuring demodulating performance of the TFCI information, equalizing average power in the system, preventing the phenomenon of excessive average power from occurring in the system, and hence further improving stability of the system.

Figure 8A:
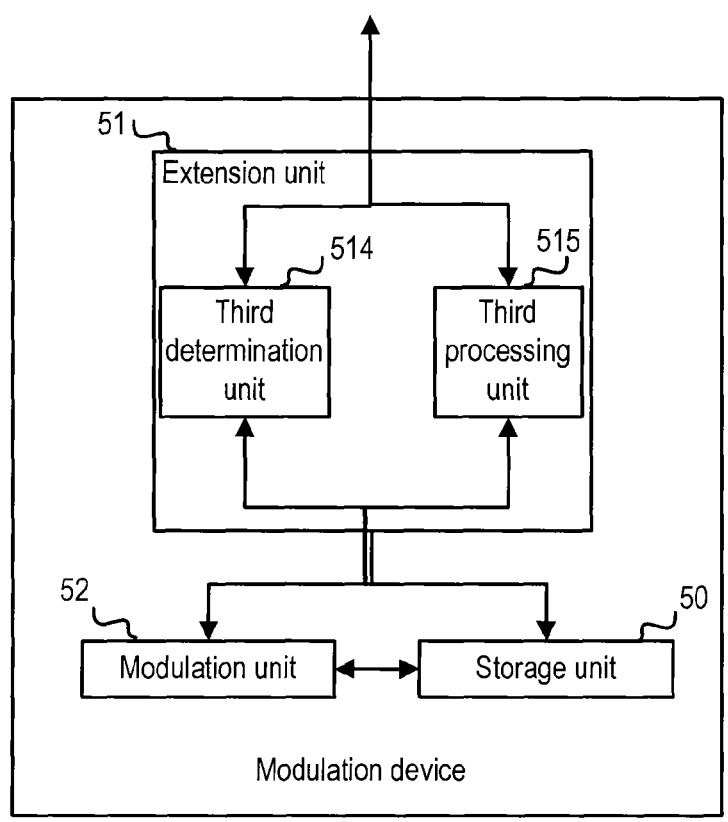
FIG. 8A is a block diagram showing the structure of a third modulation device in an embodiment of the invention.

Unlike the foregoing embodiment, in order to give consideration to the demodulating performance of TFCI information and the peak-to-average ratio in the system, the modulation device in another embodiment may alternatively modulate the respective parts of TFCI information, into which the original TFCI information is divided equally, by mapping them respectively to intermediate power points in the LCR TDD 16QAM constellation. Referring to FIG. 8A, the extension unit 51 in the modulation device of the present embodiment includes a third determination unit 514 and a third processing unit 515.

The third determination unit 514 is adapted to determine the designated energy points, which are intermediate power points other than the energy points of maximum and minimum power points in the LCR TDD 16QAM constellation.

The third processing unit 515 is adapted to extend the resultant parts of the TFCI information after the division to correspond to the identifiers of the intermediate power points in the LCR TDD 16QAM constellation.

The modulation unit 52 is further adapted to map the respective extended parts of TFCI information to the corresponding intermediate power points.

Detailed descriptions are presented below by way of example of the original TFCI information of "00011011" again.

Figure 8B:
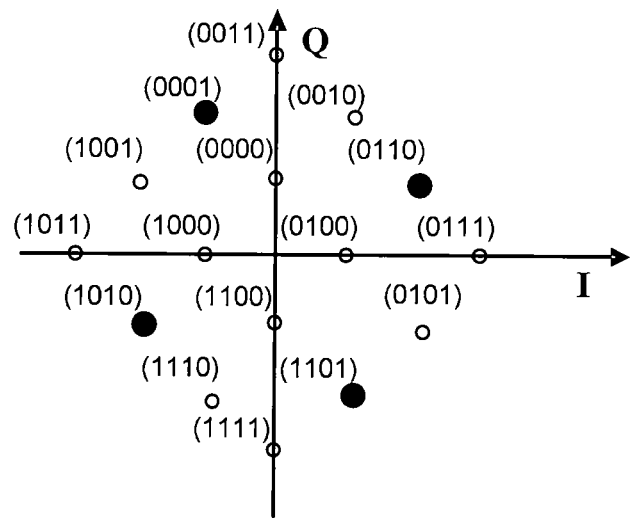
FIGS. 8B and 8C illustrate third and fourth LCR TDD 16QAM constellations in embodiments of the invention, respectively.
Figure 8C:
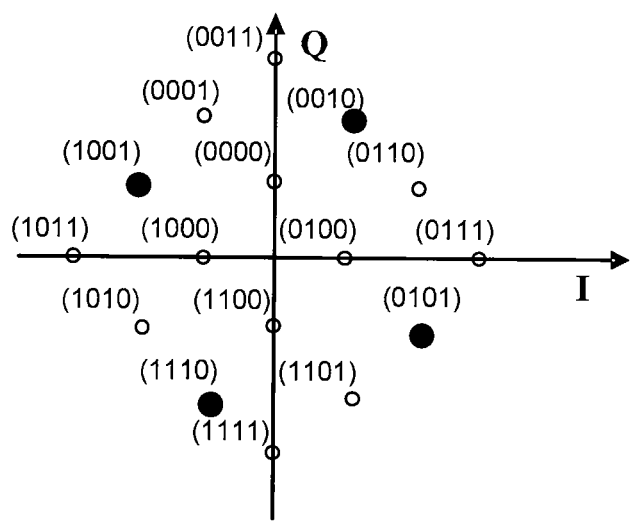

Referring to FIGS. 8B and 8C, the respective energy points are distributed evenly in the LCR TDD 16QAM constellation while any two adjacent energy points are at the same distance, therefore it can be seen that eight intermediate power points located in respective quadrants and identified with "0001", "0110", "1010", "1101", "1001", "0010", "1110" and "0101" are at the same distance from the origin, and also the TFCI information mapped to the eight energy points has the same signal power. As illustrated in FIGS. 8B and 8C, the distance of an intermediate power point to the origin is larger than that of a minimum power point to the origin and less than that of a maximum power point to the origin, and as can be apparent, if the extended TFCI information is mapped to the intermediate power points for modulating, the signal strength of the TFCI information can be ensured to some extent while the average power in the system is neither excessive nor insufficient, thereby giving consideration to the demodulating performance of the TFCI information and the peak-to-average ratio in the system.

Figure 9:
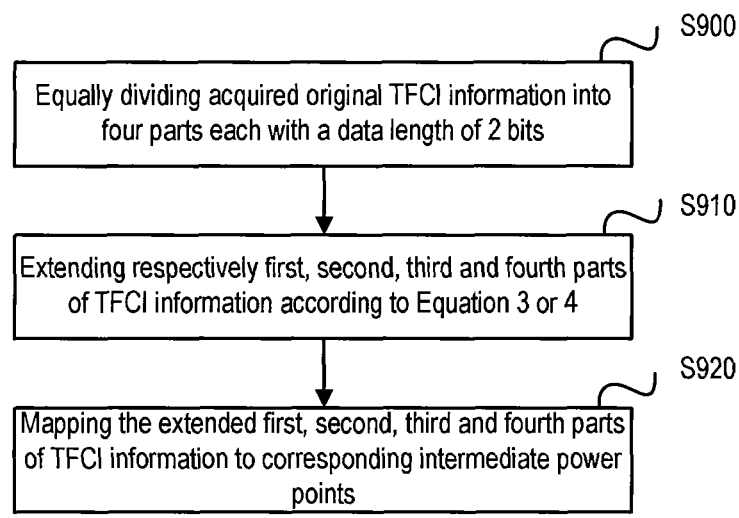
FIG. 9 is a flow chart of a third method for modulating TFCI information in an embodiment of the invention.

In the present embodiment, the original TFCI information in a TTI is "00011011", and the modulation device divides equally the original TFCI information into four parts in a unit of 2 bits, i.e., "00", "01", "10" and "11" respectively, and may modulate the four parts of TFCI information by extending and then mapping them respectively to any four of the intermediate power points in the LCR TDD 16QAM constellation, where in a preferred modulation, the extended four parts of TFCI information are mapped respectively to the intermediate power points located in different quadrants. Referring to FIG. 9, in the case of a TTI of 10 ms in the system, the modulation device in the present embodiment modulates the TFCI information in a third method with the following specific flow.

Process S900: The modulation device acquires original TFCI information of "00011011" in a TTI and divides equally the original TFCI information into "00", "01", "10" and "11".

Process S910: The modulation device extends the "00", "01", "10" and "11" according to Equation 3 to convert them into "0001", "0110", "1010" and "1101" corresponding to the identifiers of the four immediate power points illustrated in FIG. 8B.

$$d_{4k}=b_{2k}$$

$$d_{4k+1}=b_{2k+1} \quad [3]$$

$$d_{4k+2}=(d_{4k}+d_{4k+1})\mod 2$$

$$d_{4k+3}=(1+d_{4k}+d_{4k+1})\mod 2$$

Alternatively, the modulation device extends the "00", "01", "10" and "11" according to Equation 4 to convert them into "0010", "0101", "1001" and "1110" corresponding to the identifiers of the four immediate power points illustrated in FIG. 8C.

$$d_{4k}=b_{2k}$$

$$d_{4k+1}=b_{2k+1} \quad [4]$$

$$d_{4k+2}=(1+d_{4k}+d_{4k+1})\mod 2$$

$$d_{4k+3}=(d_{4k}+d_{4k+1})\mod 2$$

Process S920: The modulation device modulates the extended respective parts of TFCI information, that is, maps unbiasedly "0001", "0110", "1010" and "1101" respectively to the four immediate power points in the LCR TDD 16QAM constellation as illustrated in FIG. 8B or maps unbiasedly "0010", "0101", "1001" and "1110" respectively to the four immediate power points in the LCR TDD 16QAM constellation as illustrated in FIG. 8C.

Based upon the foregoing embodiment, in the case of a TTI in the system of more than 10 ms, e.g., 20 ms, 40 ms or 80 ms, the modulation device may extend the four parts of TFCI information, into which the original TFCI information is divided equally, using alternately Equations 3 and 4 and modulate the four extended parts of TFCI information using alternately the LCR TDD 16QAM constellations as illustrated in FIGS. 8B and 8C. Thus, a tradeoff may be achieved between maintaining the demodulating performance of the TFCI information and equalizing the peak-to-average ratio in the system while acquiring a diversity gain for the system due to modulation of the extended TFCI information using alternately the foregoing two approaches. Referring to FIG. 8B, for example, if strong interference is present between the two energy points of "0011" and "0001", the interference may influence a modulation result to some extent when the TFCI information is mapped to the energy point of "0001" for modulating. As can be apparent, no satisfactory modulation result still can be attained if the TFCI information is mapped to "0001" again. Therefore, the TFCI information may be mapped subsequently to the energy point identified with "1001" for modulating, to keep away from the interference to some extent, thereby attaining a relatively perfect modulation result and thus ensuring the demodulating performance of the modulated TFCI information for a significantly lowered probability that a demodulation error occurs and a consequential diversity gain of the system.

Of course, in the case of original TFCI information of "11111111", the modulation device may map the respective extended parts of TFCI information to the same intermediate power point of "1110" or respectively to the two intermediate power points of "1110" and "1101" for modulating, thereby achieving the same technical effect. The present embodiment only provides a preferred implementation, and redundant descriptions thereof are omitted here.

In a practical application, the modulation device may also modulate the TFCI information in the system using the method according to the embodiments of the invention in the case of another kind of modulation scheme, e.g., 64QAM, 256QAM, for the LCR TDD MBMS.

For example, the data length of the TFCI information is 8 bits in the case of the 64QAM modulation scheme for the LCR TDD MBMS, and then the modulation device may also divide the acquired original TFCI information into four parts, add 4 bits respectively following the four parts of TFCI information to extend the four parts of TFCI information from 2 bits to 6 bits in data length, that is, extend the original TFCI information from 8 bits to 24 bits in data length, and then map unbiasedly the respective extended parts of TFCI information to at least one other energy point than a minimum power point in a LCD TDD 64QAM constellation for modulating. On the other hand, if the data length of the original TFCI information is larger than 8 bits, e.g., 12 bits, 16 bits, the modulation device may simply divide equally the TFCI information in a unit of 2 bits and extend the respective parts of TFCI information using the foregoing method and then modulate the respective extended parts of TFCI information according to the LCR TDD 64QAM constellation. Alike, TFCI information in the system may also be modulated using the various methods according to the invention in the case of the 256QAM modulation scheme for the LCR TDD MBMS, and redundant descriptions thereof are omitted here.

Figure 10:
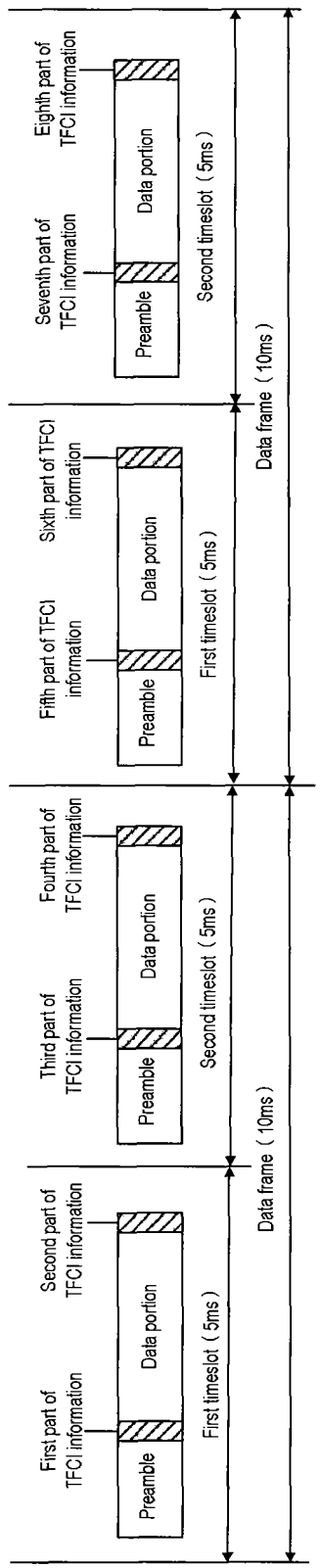
FIG. 10 is a schematic diagram of a second data frame structure in an embodiment of the invention.

Further in a practical application, the modulation device may encapsulate the extended TFCI information on both sides of a data portion in a data frame in addition to encapsulation thereof on both sides of Midamble codes as illustrated in FIG. 6B. Referring to FIG. 10, taking original TFCI information with a data length of 16 bits as an example, the modulation device acquires the original TFCI information of 16 bits, divides equally it into eight parts in a unit of 2 bits and extends them, thus transmission of the eight extended parts of TFCI information requires occupancy of two data frames with a duration of 10 ms, each of the data frames still contains two timeslots with a duration of 5 ms, and in each of the timeslots, every two of the extended parts of TFCI information are arranged following Preamble codes and a data portion respectively, i.e., on both sides of the data portion.

In the embodiments of the invention, the modulation device may modulate the acquired original TFCI information by extending the respective parts of TFCI information, into which the original TFCI information is divided equally, according to the identifiers of the designated energy points in the preset constellation and mapping unbiasedly the respective extended parts of TFCI information to the corresponding energy points, thereby ensuring the signal strength of the TFCI information in the system and hence the demodulating performance of the TFCI information, and also avoiding the fluctuating of average power in the system and hence improving the stability of the system to some extent.

Lastly it shall be noted that the foregoing embodiments are merely intended to illustrate but not limit the technical solutions in the embodiments of the invention, although the invention has been detailed with reference to the preferred embodiments thereof, those ordinarily skilled in the art shall appreciate that modifications or equivalent substitutions may be made to the technical solutions in the embodiments of the invention without departing from the scope of the technical solutions in the embodiments of the invention.

The invention claimed is:

1. A method for modulating Transport Format Combination Indicator TFCI information, comprising:
    dividing equally original TFCI information in a unit of 2 bits in a Transmission Time Interval TTI;
    extending the resultant respective parts of the TFCI information after the division to correspond to identifiers of one or more designated energy points in a preset constellation; and
    mapping the respective extended parts of the TFCI information to the corresponding energy points for modulating,
    wherein every two of the modulated parts of TFCI information are arranged respectively on both sides of corresponding midamble codes or a corresponding data portion in a data frame.

2. The method of claim 1, wherein the constellation is adapted to modulate the TFCI information, and the designated energy point is other than the minimum power point in the constellation.

3. The method of claim 1, wherein if the number of the designated energy points is larger than one, all the designated energy points have the same power.

4. The method of claim 1, wherein the designated energy point is the maximum power point in the constellation.

5. The method of claim 1, wherein the designated energy point is an intermediate power point other than maximum and minimum power points in the constellation.

6. The method of claim 4, further comprising: extending the resultant respective parts of the TFCI information after the division to correspond to the identifiers of one or more minimum power points in the preset constellation; and
    wherein the TFCI information is extended in a unit of a preset interval within the TTI, and the resultant respective parts of the TFCI information after the division are extended to correspond to the identifiers of the maximum power points in one of any two adjacent intervals and to correspond to the identifiers of the minimum power points in the other interval.

7. The method of claim 4, wherein if the data length of the original TFCI information is 8 bits and the resultant four parts of the TFCI information after the division are different from one another, the four parts of TFCI information are extended and then mapped to the corresponding maximum power points in one-to-one correspondence.

8. The method of claim 5, wherein the intermediate power points are distributed arbitrarily in four quadrants in the constellation.

9. The method of claim 5, wherein the intermediate power points are distributed evenly in four quadrants in the constellation.

10. The method of claim 8, wherein the intermediate power points are divided into at least two sets; and
    the TFCI information is extended in a unit of a preset interval in the TTI, and the resultant respective parts of the TFCI information after the division are extended respectively to correspond to the identifiers of the respective sets of intermediate power points in any at least two adjacent intervals.

11. The method of claim 8, wherein if the data length of the original TFCI information is 8 bits and the resultant four parts of TFCI information after the division are different from one another, the resultant respective parts of the TFCI information after the division are extended and then mapped to corresponding intermediate power points in one-to-one correspondence.

12. A modulation device for modulating Transport Format Combination Indicator TFCI information, comprising:
    a storage unit adapted to store a preset constellation;
    an extension unit adapted to equally divide acquired original TFCI information in a unit of 2 bits in a Transmission Time Interval TTI and extend the resultant respective parts of the TFCI information after the division to correspond to identifiers of one or more designated energy points in the preset constellation; and
    a modulation unit adapted to map the respective extended parts of the TFCI information to the corresponding energy points to modulate,
    wherein every two of the modulated parts of TFCI information are arranged respectively on both sides of corresponding midamble codes or a corresponding data portion in a data frame.

13. The modulation device of claim 12, wherein the extension unit further comprises:
    a first determination unit adapted to determine the designated energy point, which is a maximum power point in the constellation; and
    a first processing unit adapted to extend the resultant respective parts of the TFCI information after the division to correspond to the identifiers of the maximum power points.

14. The modulation device of claim 12, wherein the extension unit further comprises:
    a third determination unit adapted to determine the designated energy point, which is an intermediate power point other than maximum and minimum power points in the constellation; and
    a third processing unit adapted to extend the resultant respective parts of the TFCI information after the division to correspond to the identifiers of the intermediate power points.

15. The modulation device of claim 13, wherein the modulation unit is further adapted to map the respective extended parts of TFCI information to the corresponding maximum power points.

16. The modulation device of claim 13, wherein the extension unit further comprises:
    a second determination unit adapted to determine the designated energy point, which is a minimum power point in the constellation; and
    a second processing unit adapted to extend the resultant respective parts of the TFCI information after the division to correspond to the identifiers of the minimum power points; and
    wherein the TFCI information is extended in a unit of a preset interval in the TTI, and the first processing unit extends the resultant respective parts of the TFCI information after the division to correspond to the identifiers of the maximum power points in one of any two adjacent intervals and the second processing unit extends the resultant respective parts of the TFCI information after the division to correspond to the identifiers of the minimum power points in the other interval.

17. The modulation device of claim 14, wherein the third processing unit divides the determined intermediate power points into at least two sets; and wherein the TFCI information is extended in a unit of a preset interval in the TTI, and the third processing unit extends respectively the resultant respective parts of the TFCI information after the division to correspond to the identifiers of the respective sets of intermediate power points in any at least two adjacent intervals.

18. The modulation device of claim 14, wherein the modulation unit is further adapted to map the respective parts of TFCI information extended by the third processing unit to the corresponding intermediate power points.

19. The modulation device of claim 16, wherein the modulation unit is further adapted to map the respective extended parts of TFCI information to the corresponding maximum or minimum power points.

20. A method for modulating Transport Format Combination Indicator TFCI information, comprising:

dividing original TFCI information in a unit of 2 bits in a Transmission Time Interval TTI;

extending the resultant respective parts of the TFCI information after the division to correspond to identifiers of one or more designated energy points in a preset constellation; and mapping the respective extended parts of the TFCI information to the corresponding energy points for modulating, wherein every two of the modulated parts of TFCI information are arranged respectively on both sides of corresponding midamble codes or a corresponding data portion in a data frame.

\* \* \* \* \*